July 19, 1938. R. R. MILLER 2,124,115
OSCILLATING DRIVE TRANSMISSION
Filed May 25, 1936 3 Sheets-Sheet 2

Inventor
Royal R. Miller
by Rummler, Rummler & Woodworth
his Attys.

July 19, 1938.   R. R. MILLER   2,124,115
OSCILLATING DRIVE TRANSMISSION
Filed May 25, 1936   3 Sheets-Sheet 3
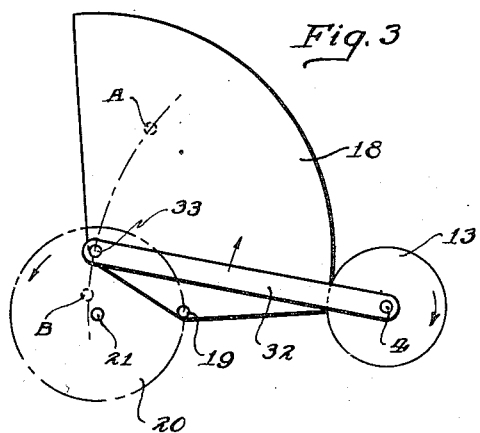
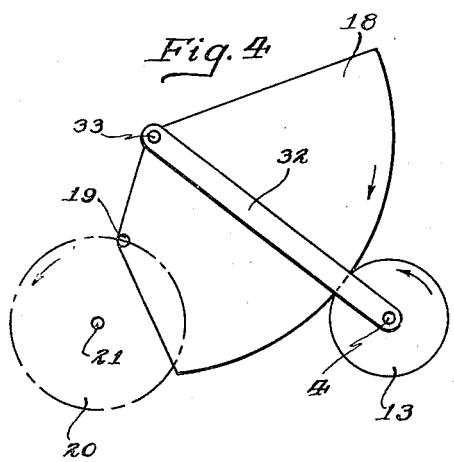
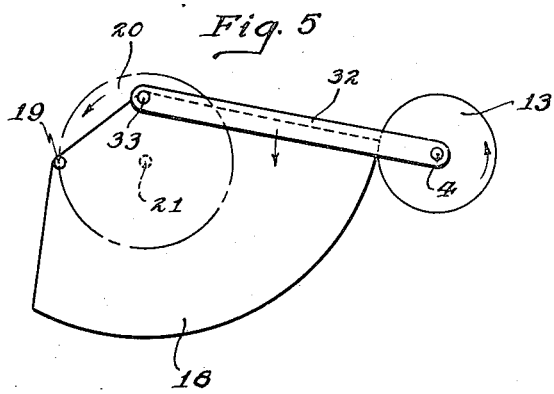
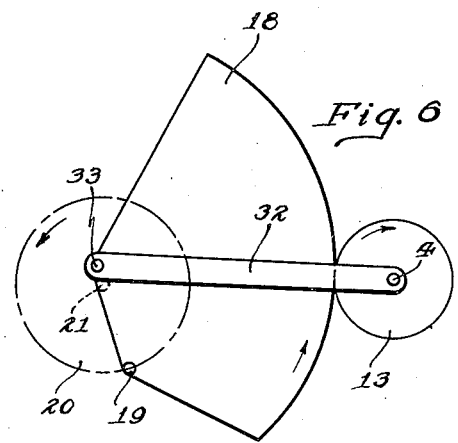
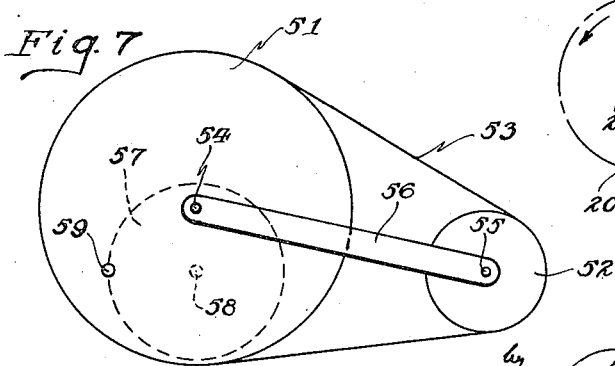
Inventor
Royal R. Miller
by Rummler, Rummler & Woodworth
his Attys.

Patented July 19, 1938

2,124,115

UNITED STATES PATENT OFFICE 2,124,115

OSCILLATING DRIVE TRANSMISSION

Royal R. Miller, Chicago, Ill., assignor of one-half to Remi J. Gits, Chicago, Ill.

Application May 25, 1936, Serial No. 81,698

6 Claims. (Cl. 74—81)

This invention relates to drive mechanisms and particularly to mechanisms for imparting an oscillating rotary motion to a driven shaft as required in oscillating mechanisms such as washing machines.

The main objects of this invention are to provide an improved and simplified drive mechanism for oscillating rotary shafts; to provide such a device requiring less space than mechanisms for a similar purpose in present use; to provide an improved drive mechanism for oscillating rotary shafts that may be operated with less power and greater efficiency than present mechanisms for a similar purpose; to provide such a drive mechanism that will operate silently and with substantially a smooth simple harmonic motion throughout each entire cycle; to provide such a drive mechanism having greater applied force at the points of reversal of the driven shaft; to provide an improved drive mechanism for oscillating driven shafts by which a greater maximum speed is imparted to the driven shaft while moving in one direction than while moving in the opposite direction; and to provide an improved drive mechanism for oscillating shafts in which power is transmitted through a toggle-like arrangement that obviates dead centers in the driving cycle.

A specific embodiment of this invention is shown in the accompanying drawings, in which:

Fig. 3 is a diagrammatic plan view illustrating the position of the driving and driven elements of the mechanism just prior to reversal of motion of the driven element.

Fig. 4 is a similar view illustrating the position of the elements at the point of maximum speed of the driven element in one direction.

Fig. 5 is a similar view showing the position of the elements just prior to reversal of motion of the driven elements from that shown in Fig. 4.

Fig. 6 is a similar view showing the position of the elements as they approach the point of maximum speed of the driven element in the direction opposite to that shown by Fig. 4, and Fig. 7 is a diagrammatic plan view of a modified arrangement of the drive mechanism employing a belt or chain in place of a gear and pinion, the elements being shown in the same relationship as those in Fig. 5.

As shown, the improved drive mechanism comprises a driven pinion, meshed with a gear segment the axis of which is shiftable in and confined to an arcuate path having the axis of the driven pinion as its center, and a crank pivotally and eccentrically connected to the gear segment and rotating about an axis located at a fixed distance from the axis of the driven pinion, the arrangement being such that during gyration of the crank about its axis the gear segment is oscillated back and forth about the axis of the driven pinion while at the same time the gear segment is oscillated back and forth about its own axial center.

Figure 1:
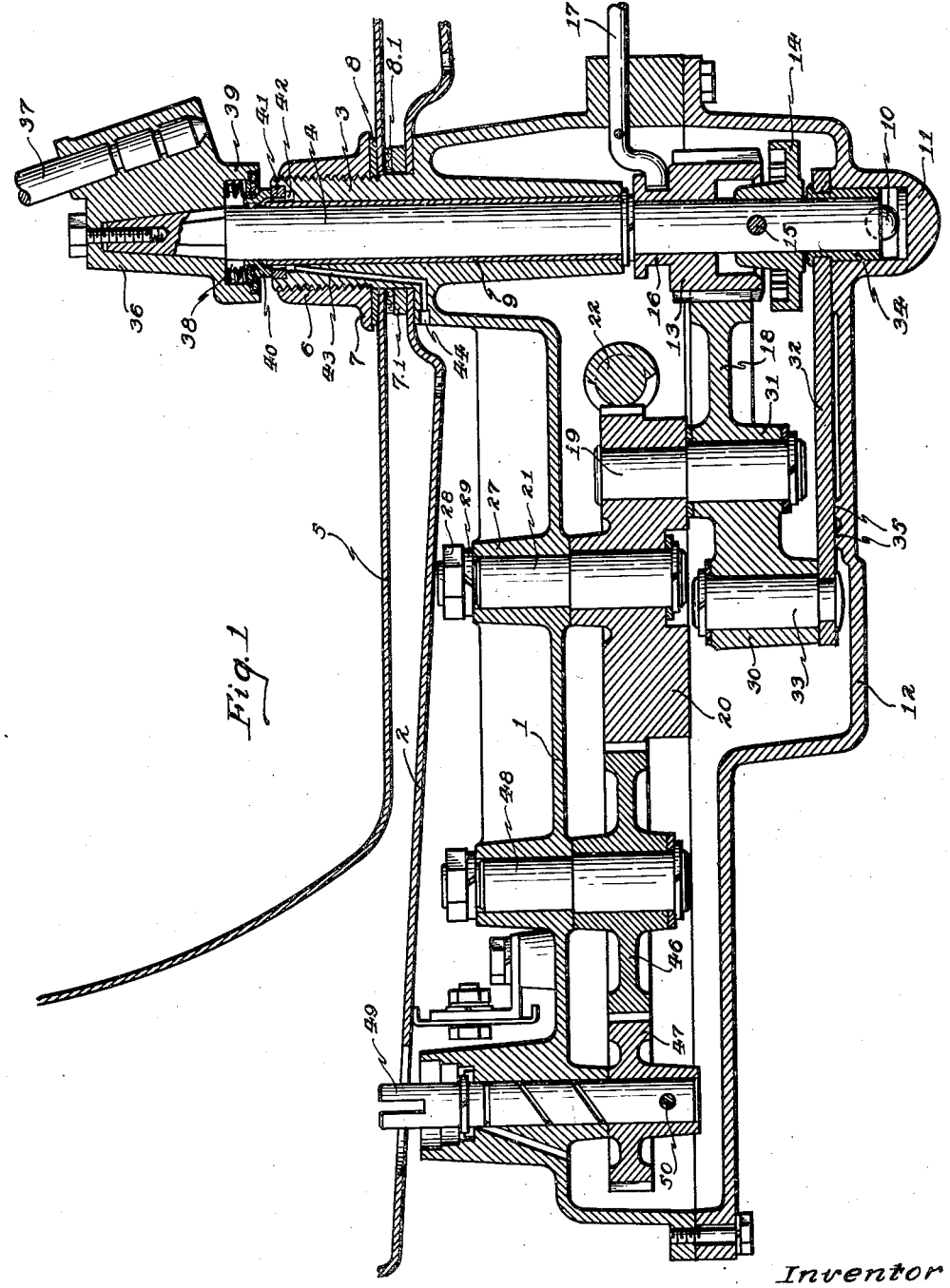
Figure 1 is a sectional elevation of the improved drive mechanism as applied to a washing machine.
Figure 2:
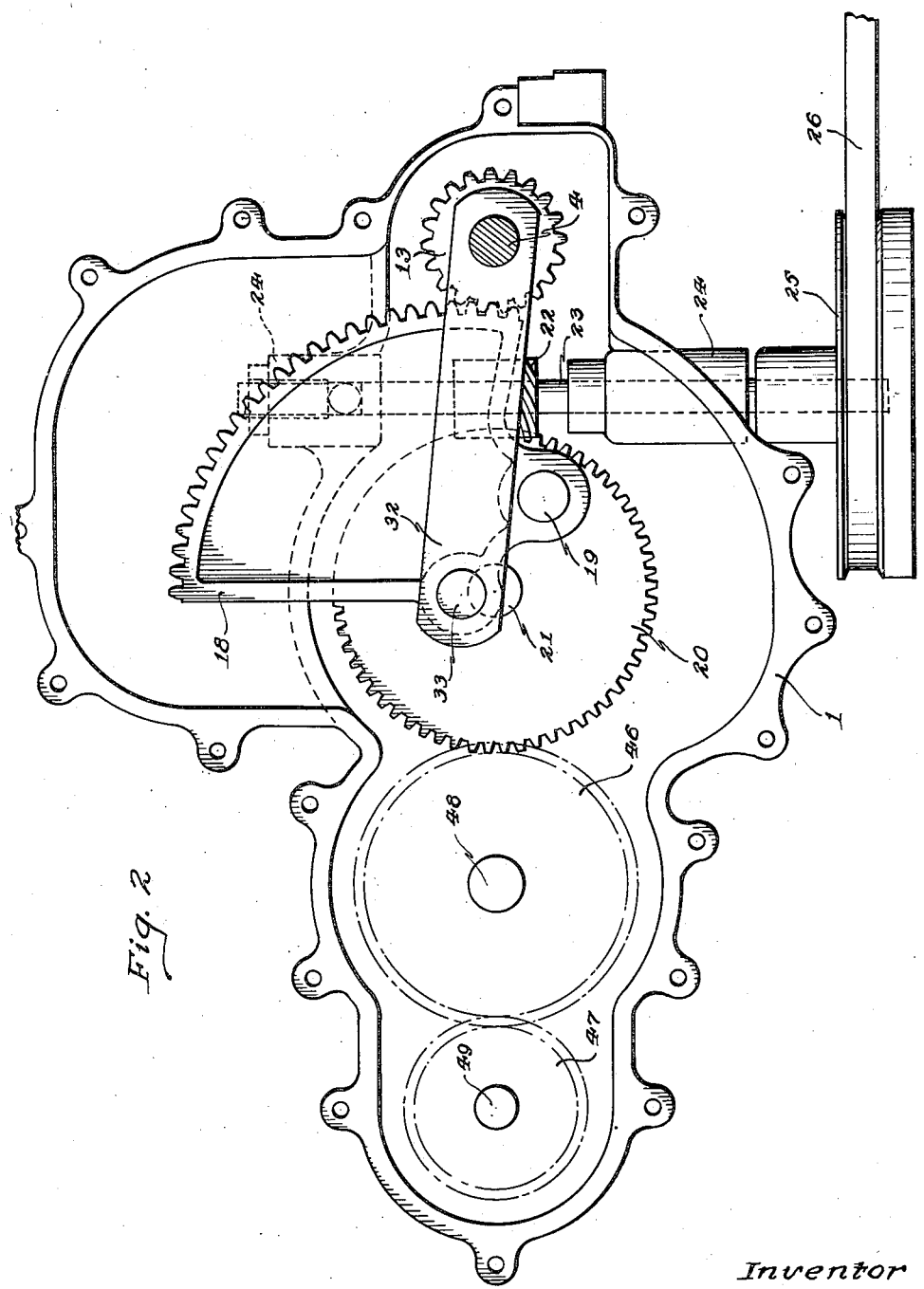
Fig. 2 is a bottom plan view of the same with the casing cover and driven shaft clutch removed.

As shown in Figs. 1 and 2, the drive mechanism is applied to a washing machine and is housed in a casing 1 which is suitably mounted by means, not shown, beneath the base plate 2 of a washing machine casing, the drive housing 1 having an upwardly extending portion 3 projecting through the base plate 2 and in which a driven shaft 4 is suitably journaled. The upwardly extending portion 3 of the casing 1 also extends through the bottom of the washing machine bowl 5 where it is suitably clamped and sealed thereto by means of a flanged collar 6 having threaded external engagement with the portion 3 and which seals the opening in the bottom of the bowl 5 through engagement of the flange 7 and a gasket 8. A metal washer or collar 7.1 and a cushioning washer or gasket 8.1 are provided between the base plate 2 and the bottom of the bowl 5, as shown, to support the clamping action of the collar 6.

The driven shaft 4 is journaled in the housing portion 3 in a suitable bearing 9 and extends upwardly into the bowl 5 and downwardly into the casing 1 where its lower end is supported on a suitable step bearing 10 mounted in a boss or well 11 formed in the bottom cover plate 12 of the housing 1.

Freely mounted on the shaft 4, so as to be rotatable thereon and shiftable axially thereof, is a driven pinion 13 and below the pinion 13 is a cup-shaped clutch member 14 having its side wall splined so as to fit over the end of the pinion 13 and engage the teeth thereof. The clutch 14 is fixed to the shaft 4 adjacent the lower end thereof by means of a pin 15 which passes transversely through the hub of the clutch member.

The pinion 13 is arranged with a flanged collar on its upper end which provides an annular channel 16 in which one end of a shifting lever 17 is seated to effect axial shifting of the pinion 13 along the shaft 4, the lever 17 being connected with suitable operating means, not shown, by means of which the pinion 13 may be shifted into and out of engagement with the clutch 14.

The driven pinion 13 is actuated by a gear 18 which, as shown, is carried on a crank pin 19 mounted in and supported by a crank wheel 20 which in turn is journaled and supported on a stub shaft 21 mounted in and depending from the upper portion of the casing 1. The crank wheel 20 is provided with gear teeth on its periphery and is driven by a helical gear 22 which is carried on a drive shaft 23 journaled in suitable bearings 24 mounted in the side wall of the upper portion of the casing 1.

The drive shaft 23 is held in place by a suitable thrust bearing and collar and extends through one side of the casing 1 where it carries a pulley 25 on its outer end. The pulley 25 is connected to a motor, not shown, by means of a belt 26.

As shown in Fig. 1, the stub shaft 21 is rigidly mounted in a suitable boss 27 formed in the top of the casing 1 and is locked in place by means of a nut 28 and a lock washer 29. The stub shaft 21 extends downwardly into the casing 1 and the crank wheel 20 is rotatably mounted thereon. The crank pin 19 is rigidly mounted in the crank wheel 20, projecting downwardly therefrom, and the driving gear 18 is rotatably mounted on the downwardly projecting portion.

As shown, the gear 18 is in the form of a sector or gear segment having a hub 30 located at the axis of its pitch circle and a second hub 31 located eccentrically relative to the hub 30. The second hub 31 is provided for the crank pin 19 which is rotatably journaled therein and, as shown, the arrangement is such that the gear 18 is supported entirely by the crank pin 19 and is free to pivot thereon. Also the eccentricity of the hub 31 and hence the crank pin 19 relative to the center of the gear 18 is less than the effective or pitch diameter of the gear 18.

The gear segment 18, however, actuates the driven pinion 13 mainly through a rotary or pivotal movement about the axis of its hub 30 and in order to maintain that axis equidistant from the pitch center of the pinion 13, and keep the gear and pinion in mesh with each other, a rocker arm or link 32 is provided. One end of the rocker arm 32 is attached to a pivot pin or shaft 33 journaled in the hub 30 of the gear 18 and the other end is fixed to a collar 34 rotatably mounted on the lower end of the driven shaft 4. Thus, while the gear 18 is being shifted bodily relative to the axis of the stub shaft 21 during rotation of the crank wheel 20, a driving engagement will always be had between the gear 18 and the pinion 13.

The relative positions of the gear 18 and the rocker arm 32 during one cycle of rotation of the crank wheel 20 are illustrated in Figures 3 to 6 inclusive which also serve to illustrate the manner of operation of the hereindescribed mechanism.

As shown, the rocker arm 32 swings back and forth angularly, pivoting on the axis of the driven shaft 4, and in order to provide a suitable bearing or resting surface for the rocker arm, so as to obviate any danger of twisting or warping of the same, a plurality of ribs 35 are provided on the inner surface of the cover plate 12, as shown in Fig. 1. These ribs extend arcuately across the surface of the cover plate 12 over which the rocker arm 32 moves.

As before-mentioned, the hereindescribed drive mechanism is illustrated as being embodied in a washing machine and as shown in Fig. 1, the driven shaft 4 extends upwardly into the interior of the washing machine bowl 5 where it carries an agitator head 36 secured on its upper end by any suitable means.

An agitator, not shown, is carried on a shaft 37 which is mounted eccentrically in the head 36 and inclined upwardly so that its axis will intersect the axis of the shaft 4 about which the head 36 rotates. The shaft 37 is secured on the head 36 by any suitable means and, as shown, is cast into the head 36 so as to be substantially an integral part thereof.

In order to seal the shaft passage through the upwardly extending casing portion 3 in which the shaft 4 is journaled, a seal 38 is mounted in a cup-shaped socket defined by an annular collar 39 projecting downwardly from the lower end of the head 36, concentrically with the axis of rotation thereof.

The seal 38 is provided with an annular collar 40 which frictionally engages a ring-shaped bearing or seat 41 in the end of the upstanding casing portion 3. The collar 40 rotates with the shaft 4 and, through frictional engagement with the seat 41, effectively seals the mechanism against leakage of water along the shaft 4 from the bowl 5 into the casing 1 where it might affect the lubrication of the drive mechanism.

However, minute quantities of water may in time pass through the seal and in order to dispose of such water, an annular collecting channel 42 is provided directly beneath the seat 41 and a drain passage 43 is formed in the side wall of the casing portion 3, so as to extend from the channel 42 to an outlet opening 44 located in the side wall of the portion 3 at a point below the base plate 2. Water drained through the passage 43 and the opening 44 falls onto the casing 1 and drains therefrom to the floor. The quantity of such water, however, is too small to be noticeable.

As shown, the drive mechanism is also arranged to operate secondary apparatus, such as a wringer, not shown. Power for such secondary apparatus is taken from the crank wheel 20 through a chain of gears 46 and 47. The gear 46 is mounted in the casing 1 in the same manner as the crank wheel 20, being rotatably mounted on a stub shaft 48 which is fixed in a suitable boss in the casing 1 and arranged to extend downwardly therefrom into the interior of the casing 1.

The gear 47 is fastened to the driven shaft 49 of the secondary mechanism by means of a pin 50 and the shaft 49 is connected to the secondary apparatus by means of a suitable clutch, not shown.

In the operation of the improved drive mechanism, power is applied to the driven shaft 4 through crank wheel 20 which oscillates the gear segment 18 back and forth, so as to cause oscillatory rotation of the driven pinion 13, the pinion 13 being connected to the shaft 4 by means of the clutch 14.

As shown, the pinion 13 is of such axial length that it may be shifted into and out of engagement with the clutch 14 while being constantly in mesh with the gear segment 18. Thus when the driven pinion 13 is disengaged from the clutch 14, it will rotate freely on the shaft 4 but the moment that engagement of the pinion and the clutch is accomplished, the shaft 4 becomes positively driven.

During the rotation of the crank wheel 20 and the accompanying gyration of the crank pin 19 about the axis of the crank wheel 20, the gear segment 18 is caused to oscillate about its axis or pivot pin 33 from the position shown in Fig. 3, to that shown in Fig. 5 and back to the position of Fig. 3. The intermediate positions of the sector 18 are illustrated in Figs. 4 and 6.

During this cycle of operation, the rocker arm 32 is caused to move angularly, pivoting on the axis of the driven pinion 13, between the positions shown in Figs. 4 and 6, these positions being indicated in Fig. 3 by the dotted circles A and B respectively.

Thus the mechanical motion accomplished is that of a four-pin quadric chain carrying a planetary. The links comprising the quadric chain are the fixed relationship of the shafts 21 and 4, the rocker arm 32, the link between the crank pin 19 and the shaft 33 of the gear 18, and the crank arm between the crank pin 19 and the shaft 21 of the crank wheel 20. The gear segment 18 comprises the planetary actuated by the linkage chain.

As will be noted from Figs. 3 to 6 inclusive, the arrangement of the elements comprising the drive mechanism is such that power is applied through a toggle action of the several levers or links comprising the quadric chain which are proportioned to obviate the possibility of the toggle links ever attaining a dead center position. The distance between the fixed centers 21 and 4, plus the length of the crank arm should always be less than the length of the rocker arm 32 plus the distance between the axis 33 of the gear 18 and the crank pin 19. Also the length of the crank arm should always be less than the distance between the axis 33 and the crank pin 19.

Substantially any desired movement may be obtained in the driven pinion 13 through varying the relative proportions of the several links of the quadric chain. Thus with one revolution of the crank wheel 20 the driven pinion 13 may be caused to travel through substantially any desired angular movement from zero, or no movement, to several revolutions. For example, by simply adjusting the length of the crank arm, variations in the extent of angular movement of the driven pinion 13 may be readily accomplished. As the crank arm is shortened the extent of angular movement of the pinion is decreased, and conversely as the crank arm is lengthened, the angular movement of the pinion is increased.

A modified arrangement of my invention is shown in Fig. 7 wherein, instead of a gear and pinion, pulleys or sprockets connected by a belt or chain are employed for the power transmission. In this arrangement the mechanical movements of the several elements and linkages are identical with those obtained in the gear and pinion arrangement shown in Figs. 3 to 6 inclusive and the results are the same, with the exception that the direction of rotation of the small driven pulley will always be the same as that of the large driving pulley.

As shown in Fig. 7, a large pulley or sprocket 51 is employed instead of a gear segment and a small pulley or sprocket 52 is used in place of a pinion, the two being drivingly interconnected by a belt or chain 53. The center or axis 54 of the large pulley 51 is pivotally connected with the axis 55 of the small pulley 52 by means of a link or arm 56, as in the case of the gear arrangement, first described, whereby the axis 54 of the pulley or driving member 51 is fixedly located relative to the axis 55 of the driven member or pulley 52 and angularly shiftable thereabout.

The actuating means is the same as in the first arrangement and comprises a crank wheel 57 rotatable on a fixed axis 58 and carrying a crank pin 59 which is eccentrically journaled in the body of the large driving pulley or sprocket 51.

This modified arrangement possesses all of the mechanical advantages and efficiency of the gear and pinion arrangement with the exception that the space requirements are somewhat increased due to the space occupied by the driving member 51.

Numerous advantages are found in the use of the hereindescribed drive mechanism and particularly in the application thereof to washing machines and other devices requiring similar action in the driven member. Among the advantages are those of decreased space requirement and greatly increased extent of angular movement in the driven shaft which have heretofore been incompatible without the aid of clutch mechanisms for effecting reversal of movement of the driven member. In mechanism ordinarily employed, the angular movement of the driven member is limited by the amount of space available for the crank arm, pitman and gear segment and as a result the angular movement of the driven member has generally been held to less than one revolution in either direction, usually in the neighborhood of 180°.

With my improved drive mechanism, not only has the space required for the moving elements been greatly reduced, but also, angular movements of the driven member to the extent of more than one complete revolution, in either direction, may readily be had. Also, with my improved drive, the maximum angular speed or velocity attained by the driven member is greater during rotation in one direction than in the other, although the angular distance of travel is the same in either direction. This action is accomplished through the linkage and planetary arrangement of the drive mechanism and is of importance, particularly in washing machines, because of novel water actions and conditions of turbulence obtained in the washing machine bowl.

Other outstanding advantages of the improved mechanism are increased mechanical efficiency, reduction of power consumption for any given load and the practical elimination of mechanical noise, the latter being particularly in the elimination of the click or mechanical slap ordinarily present at each reversal of motion of the driven element.

The mechanism as shown is particularly arranged and proportioned as a washing machine drive wherein the driven element or shaft is rotated substantially one and one-quarter revolutions in each direction, which produces a desirable and effective water action in the washing machine tub or bowl resulting in an overlap of the reversing water currents and a greatly increased agitation of the material being handled.

Compared with a well-known device of like capacity, the improved device consumes substantially 35% less power when running idle and substantially 25 to 30% less power when equally loaded. Hence, it is at once apparent that the power saving is material and important. This power saving is apparently due to the toggle arrangement whereby the power is transmitted to the driven shaft.

In the ordinary mechanisms, the peaks of power consumption occur at the reversal points where the direction of rotation of the driven shaft is changed and at which points the leverage of the driving elements is the least. With the improved arrangement the power peaks likewise occur at the reversal points but are considerably lessened due to the increased leverage afforded by the toggle linkage in the power chain.

Although but one specific embodiment of this invention has been herein shown and described, it will be understood that details of the construction shown may be altered or omitted without departing from the spirit of this invention as defined in the following claims:

I claim:

1. A drive mechanism comprising a driven pinion, a gear meshed with said driven pinion, a crank, a crank pin on said crank having eccentric pivotal connection with said gear, means to gyrate said crank pin about a fixed axis, and means arranged to maintain the axis of said gear at a fixed distance from the axis of said pinion, the length of said crank being less than the eccentricity of said crank pin relative to the axis of said gear.

2. A drive mechanism comprising a driven pinion, a gear meshed with said driven pinion, a crank, a crank pin on said crank having eccentric pivotal connection with said gear, means to gyrate said crank and said crank pin about a fixed axis, and means arranged to maintain the axis of said gear at a fixed distance from the axis of said pinion, the length of said crank being less than the eccentricity of said crank pin connection relative to the axis of said gear.

3. A drive mechanism comprising a driven pinion, a gear meshed with said driven pinion and being shiftable angularly relative to the axis thereof, a crank, a crank pin on said crank having eccentric pivotal connection with said gear, means to gyrate said crank and said crank pin about a fixed axis, and means arranged to maintain the axis of said gear at a fixed distance from the axis of said pinion, the length of said crank being less than the eccentricity of said crank pin relative to the axis of said gear.

4. A drive mechanism comprising a driven member, a driving member mounted to oscillate on its own axis and cooperable with said driven member for driving the same, and a rotatable crank eccentrically connected directly to said driving member, the eccentricity of said crank connection on said driving member being less than the effective diameter thereof, and said driving member being shiftable about the axis of said driven member for increasing its effective oscillatory throw under the action of said crank.

5. A drive mechanism comprising a driven pinion, a gear meshed with said pinion, the axis of said gear being shiftable angularly relative to the axis of said pinion, a crank arranged to rotate about a fixed axis, said crank being journaled eccentrically on said gear and within the pitch circle thereof, means to rotate said crank and means arranged to maintain the axis of said gear at a fixed distance from the axis of said pinion.

6. A driven mechnism comprising a driven pinion, a gear segment meshed with said pinion, the axis of said gear segment being shiftable angularly relative to the axis of said pinion, a crank arranged to rotate about a fixed axis, said crank being journaled eccentrically on said gear segment and within the pitch circle thereof, means to rotate said crank, and means arranged to maintain the axis of said gear segment at a fixed distance from the axis of said pinion.

ROYAL R. MILLER.